UNITED STATES PATENT OFFICE.

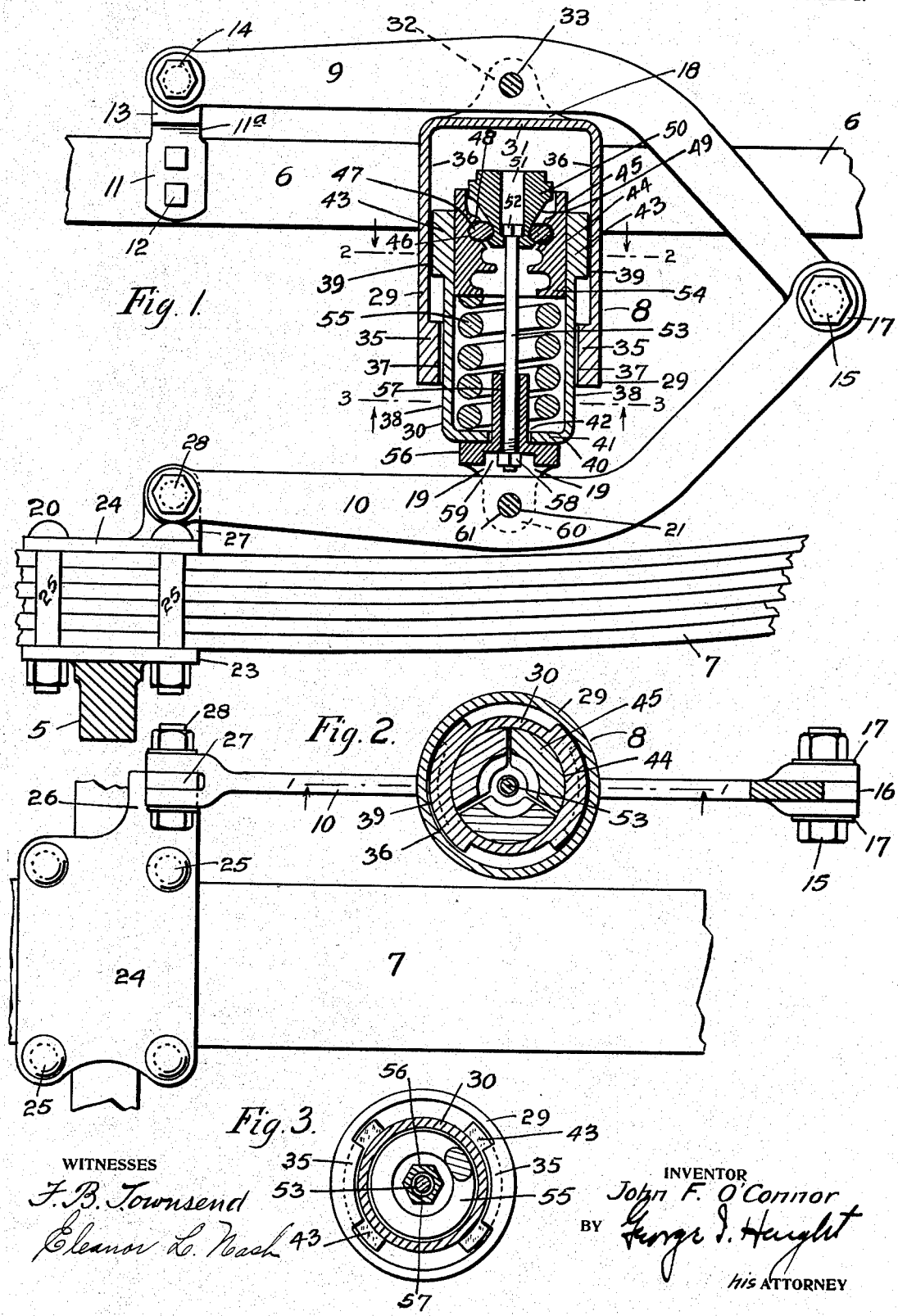

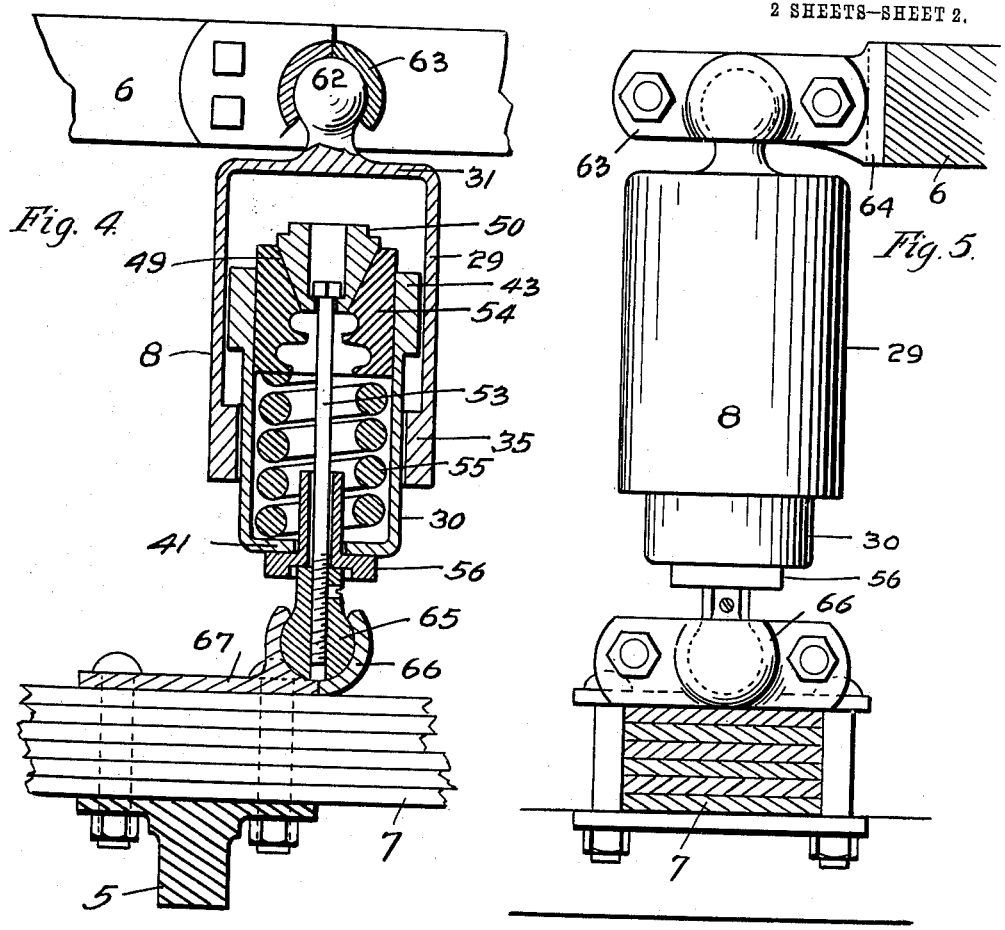

JOHN F. O'CONNOR, OF CHICAGO, ILLINOIS, ASSIGNOR TO WILLIAM H. MINER, OF CHICAGO, ILLINOIS.

SHOCK-ABSORBING DEVICE FOR VEHICLES.

1,073,161.  Specification of Letters Patent.  Patented Sept. 16, 1913.

Application filed December 6, 1911. Serial No. 664,134.

*To all whom it may concern:*

Be it known that I, JOHN F. O'CONNOR, a citizen of the United States, residing at Chicago, in the county of Cook and State of Illinois, have invented a certain new and useful Improvement in Shock-Absorbing Devices for Vehicles, of which the following is a full, clear, concise, and exact description, reference being had to the accompanying drawings, forming a part of this specification.

My invention relates to improvements in shock absorbing devices for vehicles.

One of the objects of my invention is to provide a shock absorber for vehicles of cheap construction and easy application.

A further object is to provide a shock absorber which, particularly in vehicles employing springs interposed between the body of the vehicle and the running gear thereof, will in the travel of the vehicle over irregularities in the road bed reduce the jar and jolt ordinarily consequent thereon, and also prevent breakage of and injury to the vehicle's springs.

It will become apparent in the description to follow herein that the principles of my invention may be applied to a variety of vehicles, and by various means of attachment, and I do not intend by the specific description of one form which my invention takes to be limited only thereto.

In the drawings Figure 1 is an elevation partly in central vertical section of a shock absorber embodying my invention. Fig. 2 is a partial plan view partly in cross section at line 2, 2 of Fig. 1. Fig. 3 is a cross section on line 3, 3 of Fig. 1. Fig. 4 is a plan view partly in central vertical section showing a modification in the means of attaching the shock absorber to the vehicle, and Fig. 5 is an elevation partly in cross section of said modification, looking in the longitudinal direction of the vehicle spring.

Referring to the drawings 6 is a portion of the body frame work or body of a vehicle, for instance the body side sill of an automobile chassis, 7 a vehicle spring, 8 a shock absorbing mechanism, 9 the upper lever arm, 10 the lower lever arm. The upper lever arm 9 is pivoted to the body or body frame work 6 by any suitable means, preferably the flange 11, which is secured to the member 6 by the bolts 12. The flange 11 is provided with an outward bend 11ª in its vertical length, removing the vertically disposed upper portion 13 outwardly a suitable distance from the vehicle body. The said flange or ear 11 and the forward end of the lever arm 9 are each suitably perforated for the reception of the bolt 14. When the body of the vehicle 6 and the spring 7 are in their normal positions the forward portions of the lever arms 9 or 10 are preferably substantially parallel both in vertical and horizontal plane. The rear portion of the lever arm 9 is downwardly curved, and the rear portion of the lever arm 10 is upwardly curved, and the same are suitably pivoted together by the bolt 15 passing through perforations in the rear ends of each lever arm.

In preferable construction the lower lever arm is provided with the vertical slot 16 into which the end of the upper lever arm fits, and the bolt 16 bears washers 17. The upper and lower lever arms fit in the grooves 18 and 19 respectively provided in the upper and lower ends of the shock absorbing mechanism 8. The forward end of the lower lever arm 10 is suitably connected to the spring 7, preferably by means of the clamp 20, consisting of substantially rectangular lower and upper plates 23 and 24 respectively, these being each provided with suitable perforations on either side of the spring to receive the clamping bolts 25. The inner edge of the upper plate 24 is provided with the integral extension 26 having an up-turned ear or flange 27 transversely perforated, and suitably pivoted to the lower lever arm 10 by the bolt 28. The said spring 7 is suitably attached to the axle 5, or portion of the vehicle's running gear.

The shock absorbing mechanism 8 consists of an outer shell 29 and an inner shell 30 oppositely arranged and interfitting. The outer shell 29 is cylindric in shape or circular in cross section, and in preferable arrangement is the upper shell. In this position its preferably integral upper end 31 is provided with upwardly extending lips or ears 32, which fit around the lever arm 9, and is suitably perforated to receive the bolt 33 by which it is pivoted to the said lever arm. The opposite end of the shell 29 is open, and is provided interiorly with preferably integral annularly arranged flanges 35 of suitable width, and preferably two in number, extending inwardly upon opposite quadrants of the inner circumference of the cylinder 29. The said outer cylinder is also interiorly provided with the friction faces 36 and 37, which are in sliding engagement with the adjoining outer friction faces 38 and 39 of the inner shell 30.

The inner friction shell 30 is cylindrical in form or circular in cross section, and is in preferable arrangement the lower shell. When so positioned it is closed at its lower end 40 by the preferably integral end plate 41, which has a vertical preferably hexagonal opening 42 in its center. The opposite end of the shell 30 is open, and is exteriorly provided with preferably integral annularly arranged flanges, of suitable width, and preferably two in number, extending outwardly upon opposite quadrants of the outer circumference of the cylinder 30. The cylinder 30 is of a size suitably smaller than the cylinder 29 to permit its fitting within the latter. In assembling the cylinders the flanges 43 pass through the spaces of the flanges 35, and upon passing through the cylinders are turned, positioning the flanges of the inner cylinder above the flanges 35 of the outer cylinder.

The inner friction shell 30 is provided with an inner cylindrical friction face 44 in frictional engagement with the annularly arranged friction shoes 45, which are preferably three in number. The said shoes are provided with the seats 46 for the anti-friction rollers 47 and stop shoulders 48 for the same. The said rollers bear against the wedge faces 49 of the wedge 50, which is provided from its central upper surface with the preferably hexagonal recess 51 to receive the preferably hexagonal head 52 of the connecting rod 53. The lower ends 54 of the shoes 45 are suitably flat to provide a seat for the upper end of the spring 55. The lower end of the spring rests against the lower end 40 of the shell 30, and surrounds the preferably hexagonal vertically hollow thimble 56 which passes through the opening 42 of the inner shell. The connecting rod 53 passes through the opening 57 in said thimble, and is provided with the nut 58 threaded thereon in the recess 59 in the outer end of said thimble. Extending downwardly from the thimble and preferably integral with the same are the lips or ears 60, which provide the recess 19 through which the lever arm 10 passes, and is perforated in alinement with the perforations 21 to receive the bolt 61.

It will be understood that in practice one of my devices will be placed on each side of a vehicle, and in four wheeled vehicles four of these devices are preferably used, one at each point of vehicle spring connection between the vehicle body and the running gear.

In the normal relative positions of the cylinders 29 and 30 the wedge 50 is preferably a suitable distance from the end 31 of the cylinder 29, and the flanges 43 of the cylinder 30 a suitable distance from the flange 35 of the cylinder 29 to permit of easy movement between the body and running gear of a vehicle, and the easy action of the vehicle's spring without bringing the friction members contained within the friction shell 30 of my device into operation. Thus in the movement of the vehicle's body and of its spring the shells 29 and 30 will move one within the other as the body of the vehicle and its springs attaching points to the running gear approach each other without action of the frictional devices contained in the friction shell 30 until the wedge 50 bears against the end 31 of the outer shell whereby the wedge will be forced against the rollers 47, and the friction shoes 45 spread outwardly in frictional bearing against the frictional surface 44, and also compress the spring 55.

On movement of the vehicle body and the points of attachment of the vehicle springs to the running gear away from each other the flanges 43 approach the flanges 35, bringing the frictional members within the said friction shell 30 into operation through the connecting rod 53.

Figs. 4 and 5 illustrate another method of attaching the shock absorbing device to a vehicle, and a variation in the wedge or spreading devices. In this form of device the anti-friction rollers and seats and stop shoulders for the same in the friction shoes are dispensed with. The wedge faces 49 are in direct frictional engagement with the friction shoes 45. This simplified form of wedging mechanism permits of a ready release action through the normal diverging and converging movements of vehicle body and running gear. In this form of attachment the lever arms 9 and 10 are dispensed with, and the shell 29 is provided at its closed end with a preferably integral ball 62 suitably within the socket 63, which is suitably attached to the vehicle body 6, preferably by means of the extended arm 64 therefrom. Also the lower end of the connecting rod 53 is provided with a ball 65, suitably secured thereto and fitting within the socket 66, which is suitably clamped to the vehicle spring 7 by the clamping device 67. This ball and socket joint attachment is particularly desirable for vehicles having considerable side sway when in motion.

It will be apparent that other suitable means of attaching my shock absorbing device to vehicles may be employed to enable the use of the same upon vehicles of many different constructions by varying the details of the said means as required for springs of various types and variously arranged springs and various relative positions of the vehicle body, and the springs employed between the same and the running gear—all without departing from the spirit of my invention.

I claim:—

1. A shock absorber comprising an outer shell incasing a friction shell reciprocating therein, and friction shoes, a wedge and spring within the friction shell, a connecting rod fastened through the friction shell and engaging the wedge at one end, and securing means at its other end, the outer shell having an internal annular flange, and the friction shell an external annular flange being adapted to engage each other on extreme outward movement of the friction shell.

2. A shock absorber for vehicles comprising a friction shell having annularly disposed flanges thereon, friction members within said shell, and an outer casing inclosing said friction shell said outer casing being provided with flanges adapted to engage the flanges of the friction shell, and limit the separating movement of the outer casing and friction shell.

3. A shock absorber for vehicles comprising an outer shell having internal annularly arranged flanges, a friction shell therein having external annularly arranged flanges, and a wedge, friction shoes and spring within said friction shell the flanges of the outer shell being adapted to engage the flanges of the friction shell to limit the separating movement of said shells.

4. A shock absorber for vehicles comprising an outer shell having internal annularly arranged flanges, a friction shell therein having external annularly arranged flanges, and friction members within said friction shell the flanges of one shell being adapted to engage the flanges of the other shell to prevent the separation of the shell.

5. A shock absorber for vehicles comprising a lever, an outer shell pivoted thereto, a second lever, a friction shell pivoted to said second lever, friction members within said friction shell, said friction shell being within said outer shell, and the two levers being pivoted together.

6. A shock absorber comprising an outer shell incasing a friction shell reciprocating therein, and friction shoes, a wedge and spring within the friction shell, a connecting rod fastened through the friction shell and engaging the wedge at one end, and securing means at its other end, the outer shell having an internal annular flange, and the friction shell an external annular flange, said flange being adapted to engage each other on extreme outward movement of the friction shell, and the connecting rod being adapted on such outward movement to draw the wedge against the friction shoes, and upon inward movement of the friction shell the said wedge being adapted to engage the outer shell, to push the wedge against the friction shoes.

7. A shock absorber for vehicles comprising an outer shell, an inner shell reciprocating therein, friction shoes, a wedge and spring within the inner shell, a connecting rod engaging the wedge at one end and passing through the inner shell at the other end, the connecting rod being adapted on outward movement of the inner shell to draw the wedge against the friction shoes, the said wedge being adapted to engage the outer shell on inward movement of the inner shell, and spread the friction shoes.

8. A shock absorber for vehicles comprising an outer shell, a friction shell therein, friction shoes, a wedge and spring within the friction shell, a lever pivotally connected to the outer shell, a second lever pivoted to the first mentioned lever, a connecting rod pivoted to said second lever at one end and engaging the wedge at its other end, the connecting rod being adapted on outward movement of the friction shell to draw the wedge against the friction shoes, the wedge being adapted on inward movement of the friction shell to engage the outer shell.

9. A shock absorber for vehicles comprising an outer shell, an inner shell reciprocating therein, friction members within the inner shell, the said shells being provided with flanges to limit the separating movement thereof.

JOHN F. O'CONNOR.

Witnesses:
ELEANOR L. NASH,
JOHN A. MARTINKUS.